Aug. 18, 1936.   W. I. JONES   2,051,407
SNAP FASTENER STUD
Filed May 25, 1933
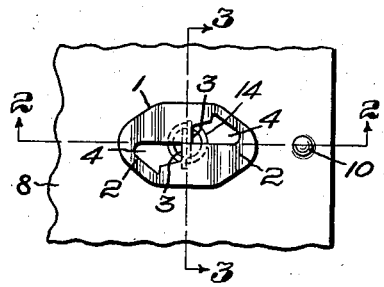
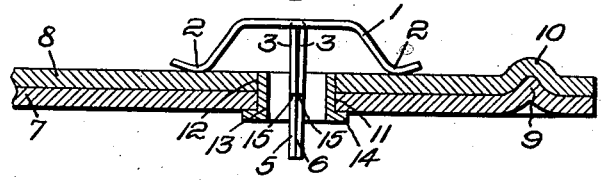
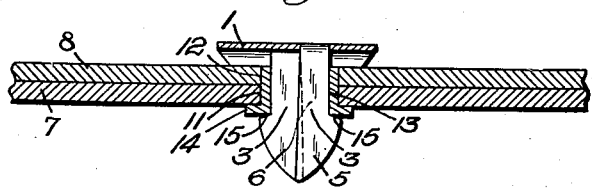
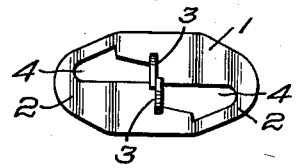
Inventor:
Walter I. Jones Patented Aug. 18, 1936

2,051,407

UNITED STATES PATENT OFFICE 2,051,407

SNAP FASTENER STUD

Walter I. Jones, Arlington, Mass., assignor to United-Carr Fastener Corporation, Cambridge, Mass., a corporation of Massachusetts Application May 25, 1933, Serial No. 672,822

1 Claim. (Cl. 85—5)

My invention aims to provide improvements in snap fasteners.

In the drawing which illustrates a preferred embodiment of my invention:—

Figure 1 is a plan view of my improved snap fastener stud in cooperation with a particular installation;

Fig. 2 is an enlarged section taken on the line 2—2 of Figure 1, the stud member being shown in elevation and in the act of being pressed into attaching position;

Fig. 3 is an enlarged section on the line 3—3 of Fig. 1 showing the stud completely attached; and Fig. 4 is an under side plan view of the stud.

My improved fastener is particularly, though not exclusively, useful in connection with an installation wherein it is desirable to secure together two plate-like portions which may be moved relative to each other flatwise and also which may have a certain amount of movement away from each other.

The particular fastener illustrated by the drawing is formed from a single piece of metal and has a base 1 preferably longer in one direction than in the transverse direction. The ends of the base are curled upwardly (Fig. 2) to provide bearing points 2—2 and that portion of the base between the bearing points is arched lengthwise to permit yielding of the base 1. While the fastener is particularly useful in securing two plate-like stud receiving parts of the nature mentioned above to form a sufficiently secure fastening to constitute a permanent installation, it is capable of disengagement from the stud receiving part by pressing the projections 3—3 toward one another directly or by appropriate flexure of the base 1 to effect this end. The fastener also includes a pair of flat, thin projections 3—3 formed integral with the base 1 and extending away from the central portion thereof, as clearly illustrated in Figs. 2 and 3. These projections 3—3 are offset relative to each other (Fig. 4) so that they may move toward each other and pass like the arms of a scissors when being engaged with or disengaged from a cooperating stud-receiving part. Each projection 3 is formed directly from the material of the base thereby leaving an aperture 4. From an inspection of the drawing, it will be noted that one projection 3 is taken from the material at one side of a line drawn transversely through the base where the projections join the base and the other is taken from the other side of this line without extending to the periphery of the base. Therefore, the base has a continuous peripheral portion and it is quite resilient thereby permitting the scissors-like action of the projections 3—3. The particular arrangement of the projections 3—3 is such that they connect with the base at points where it is not weakened to any extent by the fact that the projections are cut out of the material of the base. Each of the projections 3—3 has an outer edge shaped to provide a stud head 5 and a neck 6.

In the particular installation which I have selected for illustration of the use of my improved fastener there are shown two thin plate parts 7 and 8 adapted to be rotated relative to each other. These plate parts 7 and 8 are provided with interlocking detent members 9 and 10. The member 7 is provided with a projection 9 forming one of the detent members and the part 8 is provided with a recess 10 providing the other detent member. When the detent members 9 and 10 are interengaged, as shown in Fig. 2, the plates 7 and 8 are held against accidental rotation. The plate 7 has an aperture 11 in alignment with the aperture 12 in the plate 8 and a bushing 13 has its tubular portion passing through both apertures and a flange 14 resting against the outer surface of the plate 7, as best shown in Figs. 2 and 3. The snap fastener member is arranged with the plates and bushing in such a manner that the bearing portions 2—2 of the base 1 rest against the outside face of the plate 8 and the projections 3—3 extend through the bushing 13 with the shoulders 15—15 of the head 5 in contact with the flange 14 of the bushing 13, as clearly illustrated in Fig. 3. During the attaching operation the base 1 of the fastener stud flexes toward the plate 8, so that the shoulders 15—15 on the projections 3—3 may pass by the bushing 13 and engage directly with the flange 14 of the bushing to hold the fastener stud in position, as best illustrated in Fig. 3. Thus the parts of the installation are held together by the stud, between the shoulders 15—15 and the bearing portions 2—2 of the base 1.

The base 1 is yieldable at all times so that there may be relative movement of the plates 7 and 8 toward and away from each other to permit disengagement of the detent elements 9 and 10 during a rotary movement of the plates. During the rotary movement the plates 7 and 8 rotate about the shank of the bushing 13, so that the bushing preferably remains stationary relative to the fastener member. Therefore, since the bushing 13 is interposed between the fastener member and the plate 7, the shoulders 15—15 cannot interfere with rotation, nor can they mar the surface of the plate as they would be likely to do if the bushing were not used.

My improved fastener is simple, formed from a single piece of metal, and has many advantages over any similar type of fastener for use with installations like that described. It is relatively easy to manufacture and quite inexpensive, since the amount of material which is necessary has been reduced to a minimum.

While I have illustrated and described a preferred embodiment of my invention, I do not wish to be limited thereby, because the scope of my invention is best defined by the following claim.

I claim:

A fastener of the class described having an elongated sheet metal base with a continuous peripheral yieldable portion and provided with spaced bearing portions and being normally arched lengthwise between the bearing portions, a pair of flat thin projections formed of metal stamped out of the base except at their roots which join with the central portion of the base adjacent one another in virtual edge to edge alignment, said projections, respectively, being formed of metal cut out of the base at opposite sides of the line virtually defined by their root edges, and said projections standing up from their root edges at substantially right angles to the base, said projections being offset relative to each other to permit an edgewise scissors like movement due only to said peripheral portion of said base and each having an outer edge shaped and arranged to cooperate with the edge of the other to make snap fastening engagement with a cooperating fastener-receiving part.

WALTER I. JONES.